US011134135B1

(12) United States Patent
Chang

(10) Patent No.: US 11,134,135 B1
(45) Date of Patent: Sep. 28, 2021

(54) MOBILE STORAGE SYSTEM FOR STORING AND TRANSFERRING DATA GENERATED BY INTERNET OF THINGS (IOT) DEVICES

(71) Applicant: Marvell International Ltd., Hamilton (BM)

(72) Inventor: Runzi Chang, Saratoga, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/574,229

(22) Filed: Sep. 18, 2019

Related U.S. Application Data

(60) Provisional application No. 62/736,921, filed on Sep. 26, 2018.

(51) Int. Cl.
*H04L 29/08* (2006.01)

(52) U.S. Cl.
CPC ...... *H04L 67/2857* (2013.01); *H04L 67/2852* (2013.01)

(58) Field of Classification Search
CPC ... H04W 24/08; H04W 16/14; H04W 64/006; H04W 24/10; H04W 72/0453; H04W 64/00; H04W 4/029; H04W 84/12; H04W 16/18; H04W 72/042; H04W 24/04; H04W 72/048; H04W 88/08; H04W 24/02; H04W 4/70; H04W 72/082; H04W 52/367; H04W 72/04; H04W 72/044; H04W 72/1289; H04W 74/0808; H04W 4/027; H04W 4/38; H04W 52/02; H04W 52/0277; H04W 52/04; H04W 52/241; H04W 52/243; H04W 52/245; H04W 52/325; H04W 52/38; H04W 72/005; H04W 72/1268; H04W 88/02; H04W 28/0221; H04W 28/04; H04W 4/026; H04W 4/12; H04W 4/40; H04W 4/46; H04W 4/80; H04W 52/0216; H04W 52/146; H04W 52/242; H04W 52/343; H04W 52/365; H04W 72/0446; H04W 72/0473; H04L 5/0053; H04L 5/001; H04L 5/0048; H04L 5/0007; H04L 5/0094; H04L 5/0098; H04L 5/0091; H04L 1/1812; H04L 5/14; H04L 69/22; H04L 61/6022; H04L 27/18; H04L 27/2602; H04L 5/005; H04L 5/0064; H04L 5/0078; H04L 1/0026; H04L 41/0645;

(Continued)

(56) References Cited

U.S. PATENT DOCUMENTS

2006/0252389 A1* 11/2006 Yellin ................ H04L 27/2608
455/115.3
2008/0212527 A1* 9/2008 Hosein ................ H04L 5/006
370/329

(Continued)

OTHER PUBLICATIONS

Farzad Samie et al, Computation Offloading and Resource Allocation for Low-Power Iot Edge Devices, 2016, 978-1-5090-4130-5/16/31.00 c 2016 IEEE.*

*Primary Examiner* — Djenane M Bayard

(57) ABSTRACT

A mobile storage system receives, by a short range network interface, data from an internet of things (IoT) device. The data is stored in storage. A communication bandwidth to a cloud data storage and a power level of a power supply is determined. Based on the communication bandwidth to the cloud data storage and the power level of the power supply, the data to the cloud data storage is transferred via a long range network interface.

23 Claims, 5 Drawing Sheets

(58) Field of Classification Search
CPC ... H04L 41/069; H04L 43/045; H04L 5/0023; H04L 5/0037; H04L 1/1819; H04L 41/0681; H04L 5/0044; H04L 5/0057; H04L 5/006; H04L 63/0853; H04L 1/0046; H04L 1/0067; H04L 1/1614; H04L 1/1671; H04L 1/1835; H04L 1/188; H04L 1/1896; H04L 27/0006; H04L 27/2601; H04L 27/261; H04L 41/0893; H04L 43/0864; H04L 43/16; H04L 5/00; H04L 5/0032; H04L 5/0046; H04L 5/0055; H04L 5/0073; H04L 5/0082; H04L 5/0087; H04L 5/0092; H04L 5/1469; H04L 1/0003; H04L 1/0006; H04L 1/0007; H04L 1/0009; H04L 1/0025; H04L 1/0035; H04L 1/0038; H04L 1/0693; H04L 1/08; H04L 2001/0098; H04L 25/0226; H04L 27/26; H04L 27/262; H04L 27/2647; H04L 5/0001; H04L 5/0035; H04L 5/0051; H04L 67/16; H04L 67/34

See application file for complete search history.

(56) References Cited

U.S. PATENT DOCUMENTS

| | | | |
|---|---|---|---|
| 2012/0047331 A1* | 2/2012 | Meza | H04L 67/2842 711/134 |
| 2014/0155116 A1* | 6/2014 | Dakshinamurthy | H04W 52/0251 455/522 |
| 2014/0206411 A1* | 7/2014 | Ruutu | H04W 24/00 455/522 |
| 2015/0056947 A1* | 2/2015 | Panchal | H04W 52/365 455/405 |
| 2015/0126117 A1* | 5/2015 | Wong | H04W 12/009 455/41.2 |
| 2018/0032997 A1* | 2/2018 | Gordon | G06Q 30/0269 |
| 2018/0176775 A1* | 6/2018 | Obaidi | H04W 76/10 |
| 2019/0121333 A1* | 4/2019 | Celia | H04B 17/345 |
| 2020/0280926 A1* | 9/2020 | Piipponen | H04W 52/146 |

* cited by examiner

MOBILE STORAGE SYSTEM FOR STORING AND TRANSFERRING DATA GENERATED BY INTERNET OF THINGS (IOT) DEVICES

CROSS REFERENCE TO RELATED APPLICATION

This disclosure claims the benefit of priority of U.S. Provisional Application Ser. No. 62/736,921 filed Sep. 26, 2018, entitled, "Mobile Storage System for Internet of Things (IoT)", the contents of which is incorporated herein by reference in its entirety.

FIELD OF USE

This disclosure generally relates to the field of data storage, and more particularly to a mobile storage system for storing and transferring data generated by Internet of Things (IoT) devices. The mobile storage system serves as an intermediary between the IoT device and a cloud data storage, facilitating reliable storage of the data generated by the IoT device on the mobile storage system as well as transfer of the data from the mobile storage system to the cloud data storage.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The "Internet of Things" (IoT) refers to an interconnection of uniquely-addressable devices within the Internet infrastructure which generate data associated with itself and its surroundings. The IoT devices have storage for storing the generated data, but this storage is usually unreliable and insufficient. To prevent loss or corruption of the data, the data on the IoT device is transferred to a cloud data storage.

In some situations, transfer of the data to the cloud data storage might not be reliable or desirable. For example, an IoT device in the form of a high definition outdoor sports digital video camera/recorder might be used in remote areas with little or no wireless communication to the cloud data storage. Transfer of the data to the cloud data storage via the wireless communication is unreliable, increasing the risk the data stored on the IoT will be corrupted or lost until it is transferred. As another example, an IoT device in the form of a wristband device or an implanted device might need to transmit high power wireless signals to communicate the data to the cloud data storage for reliable storage. The high power wireless signals pose a health risk to the user. In this regard, there are inherent challenges associated with preventing corruption or loss of the data generated by the IoT device.

SUMMARY

This disclosure relates to a mobile storage system for storing and transferring data generated by Internet of Things (IoT) devices. In examples, the mobile storage system serves as an intermediary between the IOT device and a cloud data storage, facilitating reliable storage of the data generated by the IoT device on the mobile storage system as well as transfer of the data from the mobile storage system to the cloud data storage.

Aspects of the disclosure provide a method comprising: receiving, by a first network interface, data from an Internet of Things (IoT) device; storing the data in storage of a mobile storage system; determining a communication bandwidth to a cloud data storage and a power level of a power supply which powers the mobile storage system; and transferring, by a second network interface, the data to the cloud data storage based on the communication bandwidth to the cloud data storage and the power level of the power supply.

In one example, the first network interface implements a Bluetooth or Near Field Communication (NFC) protocol and the second network interface implements a cellular protocol. In another example, the method further comprises receiving an indication that a user authorizes the transfer of the data to the cloud data storage based on the power level and communication bandwidth; and wherein transferring the data to the cloud data storage comprises transferring the data to the cloud data storage based on the indication. In yet another example, the power level of the power supply is a charge of a battery. In another example, the method further comprises sending an indication of the communication bandwidth and the power level to a remote device and receiving an indication from the remote device to transfer the data; and wherein transferring the data comprises transferring the data based on the indication from the remote device. In yet another example, the IoT device is an imaging device or a health monitoring device. In another example, the method further comprises transferring the data to the cloud data storage based on the communication bandwidth to the cloud data storage and the power level of the power supply comprises determining whether the power level of the power supply is able to power the mobile storage system until the data is transferred based on the communication bandwidth to the cloud data storage.

Aspects of the disclosure provide a non-transitory computer-readable medium storing instructions that, when executed by one or more processors, cause the one or more processors to at least: receive, by a first network interface, data from an Internet of Things (IoT) device; store the data in storage of a mobile storage system; determine a communication bandwidth to a cloud data storage and a power level of a power supply of the mobile storage system; and transfer, by a second network interface, the data to the cloud data storage based on the communication bandwidth to the cloud data storage and the power level of the power supply.

Aspects of the disclosure provide a mobile storage system comprising a storage having a solid state drive or a hard disk drive; a first network interface; a second network interface; a communication bandwidth detector; a power level detector; instructions stored in memory of the mobile storage system, when executed by one or more processors of the mobile storage system, cause the mobile storage system to at least: receive, by the first network interface, data from an Internet of Things (IoT) device; store the data in the storage of the mobile storage system; determine, by the communication bandwidth detector, a communication bandwidth to a cloud data storage and, by the power level detector, a power level of a power supply of the mobile storage system; and transfer, by the second network interface, the data to the cloud data storage based on the communication bandwidth to the cloud data storage and the power level of the power supply.

In one example, the first network interface implements a Bluetooth or Near Field Communication (NFC) protocol and the second network interface implements a cellular protocol. In another example, the mobile storage system further comprises instructions to receive an indication that a user authorizes the transfer of the data to the cloud data storage based on the power level and communication bandwidth; and wherein the instructions to transfer the data to the cloud data storage comprises instructions to transfer the data to the cloud data storage based on the indication. In yet another example, the power level of the power supply is a charge of a battery. In another example, the mobile storage system further comprises instructions to send an indication of the communication bandwidth and the power level to a remote device and receive an indication from the remote device to transfer the data; and wherein the instructions to transfer the data comprises instructions to transfer the data based on the indication from the remote device. In yet another example, the instructions to transfer the data to the cloud data storage based on the communication bandwidth and the power level of the power supply comprises instructions to determine whether the power level of the power supply is able to power the mobile storage system until the data is transferred based on the communication bandwidth to the cloud data storage.

In this regard, the mobile storage system alleviates problems associated with storing and transferring the data generated by the IoT device.

Figure 1:
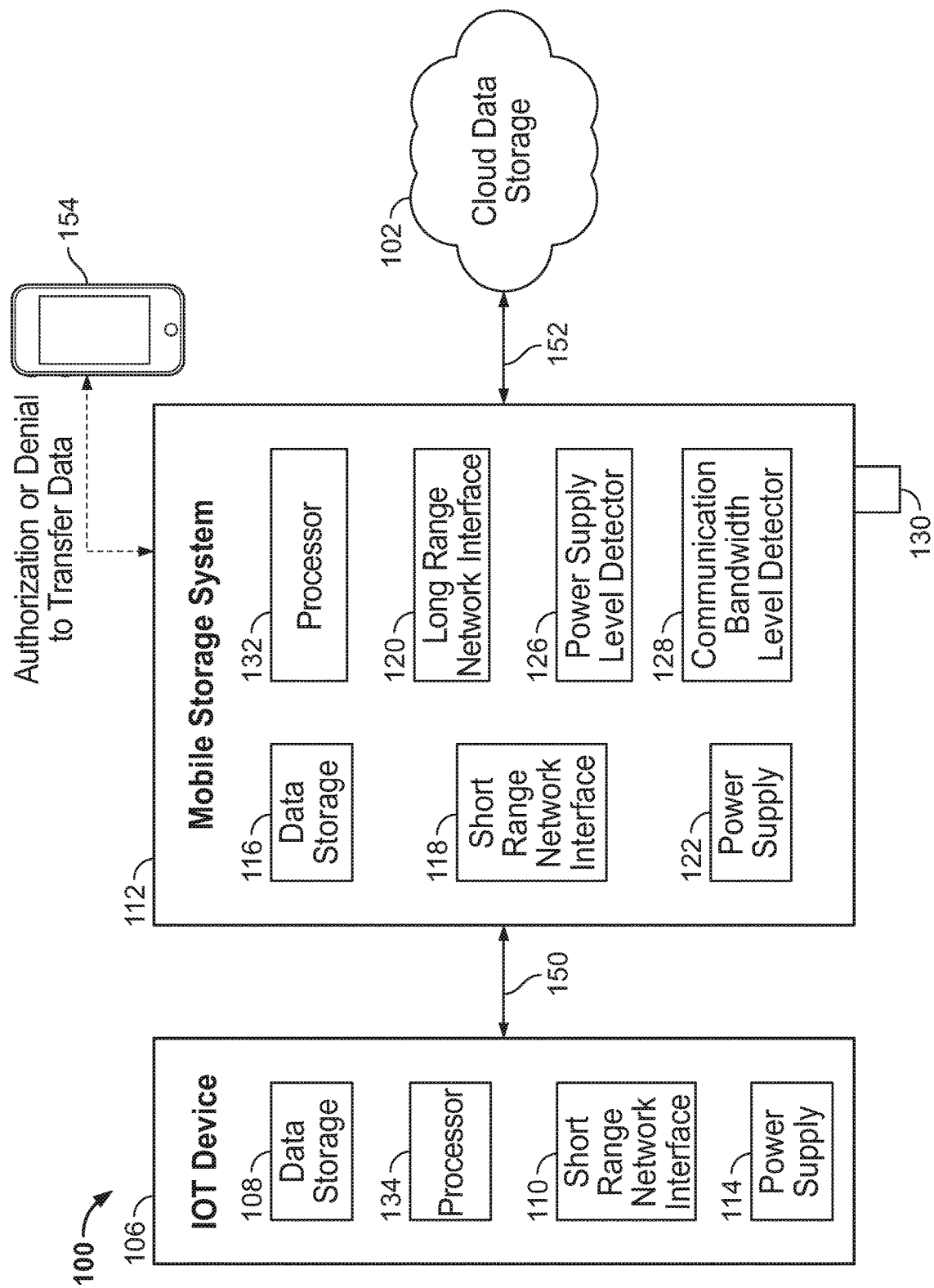
FIG. 1 illustrates an example configuration of a mobile storage system for reliably storing and transferring data generated by one or more IoT devices.

The drawings are for the purpose of illustrating example embodiments, but it is understood that the embodiments are not limited to the arrangements and instrumentality shown in the drawings.

DETAILED DESCRIPTION

This disclosure provides examples and details related to a mobile storage system for storing and transferring data generated by Internet of Things (IoT) devices. The mobile storage system serves as an intermediary between the IoT device and a cloud data storage, facilitating reliable storage of the data generated by the IoT device on the mobile storage system as well as transfer of the stored data to a cloud data storage. In some examples, the mobile storage system may also store data generated by other types of electronic devices which are not IoT devices and the mobile storage system may not be "mobile" as described herein. Additionally, the data may be transferred to a remote data storage which is not the cloud data storage. The principles described herein may still apply to storing the data generated by the other types of devices and transferring the stored data to the data storage.

FIG. 1 illustrates an example configuration 100 of a mobile storage system for reliably storing data generated by one or more IoT devices. The example configuration 100 includes a cloud data storage 102, the IoT device 106, and the mobile storage system 112. The cloud data storage 102 may store data in physical storage which may span multiple networked servers, sometimes in multiple locations, typically referred to as a cloud. Cloud data storage 102 is typically a model of service delivery for enabling convenient, on-demand network access to a shared pool of configurable servers, memory, storage, etc. that can be provisioned and released. In examples, the cloud data storage 102 may be made up of many distributed resources.

The IoT devices 106 may be configured as one or more addressable electronic devices within the Internet infrastructure which typically generate data associated with itself and its surroundings, beyond standard devices such as desktops, laptops, smartphones and tablets. The IoT device 106 may take a variety of forms. For example, the IoT device 106 may be an imaging device such as a high definition outdoor sports digital video camera/recorder which generates data in the form of images or video. As another, example, the IoT device 106 may be a sensor such as a wristband device or an implanted device in a user which generates data in the form of vitals of the user. The IoT device 106 may take other forms in the consumer market such as products pertaining to the concept of the "smart home", including devices and appliances such as lighting fixtures, thermostats, home security systems, and other home appliances.

The IoT device 106 may have a data storage 108 local to the IoT device 106 to store the generated data. The data storage 108 is typically limited in space and reliability to reduce cost of the IoT device 106. Additionally, the IoT device 106 may have a short range network interface 110 to facilitate communications with a remote device such as the mobile storage system 112. For example, the short range network interface 110 allows the IoT device 106 to transmit the data generated by the IoT device 106 to the mobile storage system 112 at low power and receive data from the mobile storage system 112 at low power. In examples, the short range network interface 110 may be a wireless network interface that facilitates short range wireless communications in accordance with an energy efficient protocol such as Bluetooth, Near Field Communications (NFC), or WiFi. Bluetooth defines a frequency hopping protocol for communications within a range of approximately 10 meters, for example. Near Field Communication (NFC) is a short-range wireless connectivity protocol that uses magnetic field induction to enable communication between devices when they're touched together, or brought within a few centimeters of each other, for example. WiFi is a wireless networking protocol that uses radio waves to provide wireless high-speed Internet and network connection in accordance with the Institute of Electrical and Electronics Engineers (IEEE) 802.11. Additionally, or alternatively, the short range network interface 110 may be a wired network interface such as Universal Serial Bus (USB). The IoT device 106 may also have a power supply 114 which might take the form of a battery to power operations on the IoT device and a processor 134 for coordinating data transfers into, within, and out of the IoT device 106. The processor 134 may be a general-purpose processor, application-specific integrated circuits (ASIC), field-programmable gate arrays (FPGA) or any other suitable types of hardware and software.

The mobile storage system 112 may be an intermediary between the IoT device 106 and the cloud data storage 102 to facilitate reliable storage of data generated by the IoT device 106. The mobile storage system 112 may be "mobile" since it is able to be physically moved as the IoT device 106 is physically moved such that the mobile storage system 112 remains in proximity to the IoT device 106. The mobile storage system 112 may have data storage 116 such as one or more hard-disk drives (HDDs), solid state drives (SSDs), or a hybrid of SSDs and HDDs. In other examples, the mobile storage system 112 may have storage class memories such as magnetic random access memory (MRAM), non-volatile memory (NVM), resistive random access memory (RRAM), among others. The mobile storage system 112 may communicate with the IoT device 106. To facilitate this communication, a communication link 150 may be established between a short range network interface 118 of the mobile storage system 112 and the short range network interface 110 of the IoT device 106. In examples, the network interface 118 may facilitate short range wireless communications in accordance with an energy efficient protocol such as Bluetooth, Near Field Communications (NFC), or WiFi. Additionally, or alternatively, the network interface 118 may be a wired network interface such as Universal Serial Bus (USB). The short range network interface 118 allows the mobile storage system 112 to receive the data generated by the IoT device 106 and transmit data to the IoT device 106 over the communication link 150.

The mobile storage system 112 may also have a long range network interface 120 which establishes a communication link 152 with a remote device such as the cloud data storage 102. The long range network interface 120 allows the mobile storage system 112 to transmit the data generated by the IoT device 106 to the cloud data storage 102. In examples, the long range network interface 120 may be a wireless network interface that facilitates long range communication protocols with the cloud data storage 102. The long range network interface 120 may be a wireless interface which implements a wireless long range communication protocol such as third generation (3G), fourth generation (4G), fifth generation (5G) cellular communication or WiFi communication. Additionally, or alternatively, the long range network interface 120 may be a wired network interface such as Universal Serial Bus (USB).

The long range network interface 120 is illustrated as a physically separate interface from the short range network interface 118. In some examples, the network interfaces 118, 120 may be a same physical network interface or integrated together into a single network interface. Further, for ease of explanation, the links 150, 152 are depicted as bidirectional links. However, in other examples, the links 150, 152 may be unidirectional links.

The mobile storage system 112 may have a power supply 122 such as a battery to power the mobile storage system 112. The battery may be a high capacity battery. Additionally, the power supply 122 may include a charging interface 130. The charging interface 130 may facilitate connecting the mobile storage system 112 to an external power source to charge the battery of the mobile storage system 112. Additionally, or alternatively, the charging interface 130 may facilitate connecting the mobile storage system 112 to the IoT device 106 to facilitate charging the battery of the IoT device 106.

The mobile storage system 112 may have a communication bandwidth level detector 128 associated with the long range network interface 120 and a power supply level detector 126 associated with the power supply 122. The communication bandwidth level detector 128 may determine a communication bandwidth with a remote device such as the cloud data storage 102 over the communication link 152. For example, the communication bandwidth may be an average data rate, peak data rate, or minimum data rate for communications to the cloud data storage 102. The power supply level detector 126 may indicate a power level associated with the power supply 122 such as a percentage battery charge. The mobile storage system 112 may also have a processor 132 for coordinating data transfers into, within, and out of the mobile storage system. The processor 132 may be a general-purpose processor, application-specific integrated circuits (ASIC), field-programmable gate arrays (FPGA) or any other suitable types of hardware and software. In examples, transfer the data generated by the IoT device 106 stored on the mobile storage system 112 to the cloud data storage 102 may be based on the power level determined by the power supply level detector 126 and/or the communication bandwidth determined by the communication level detector 128.

In some examples, a remote device 154 may also facilitate operation of the mobile storage system 112. The remote device 154 may take the form of a desktop computer, a laptop computer, a tablet computer, a smart phone, or a personal digital assistant (PDA), among other forms. A communication may be established between the remote device 154 and the mobile storage system 112 via the short range network interface 118 and/or long range network interface 120. As described in further detail below, the communication may include a user sending, via the remote device 154, an indication to authorize or not authorize the transfer data from the mobile storage system 112 to the cloud data storage 102. In some examples, the authorization may be further based on the indication of the power level and communication bandwidth which is sent to the remote device 154. The user of the remote device 154 reviews the power level and communication bandwidth and then causes the remote device to send the indication to authorize or not authorize the transfer data. In this regard, the data generated by the IoT device 106 stored on the mobile storage system 112 to the cloud data storage 102 may be further based on user input.

Example Operations

Figure 2:
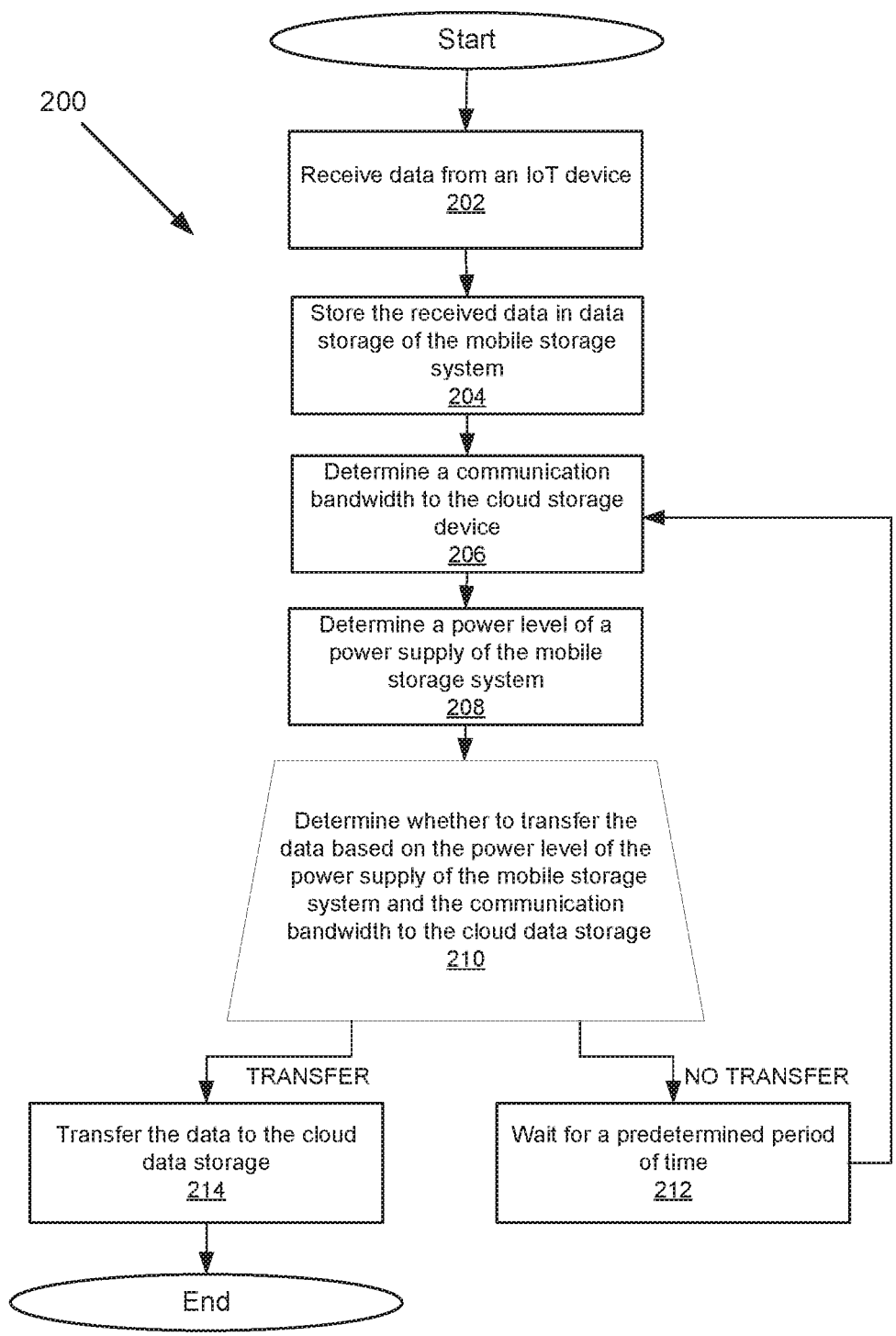
FIG. 2 is an example flow chart of functions associated with the mobile storage system for transferring the data generated by the IoT device which is stored on the mobile storage system to the cloud data storage.

FIG. 2 is an example flow chart 200 of functions associated with the mobile storage system for transferring the data generated by the IoT device which is stored on the mobile storage system to the cloud data storage. The transfer may be opportunistic and efficient because power is not unnecessarily wasted in transferring the data. The functions may be implemented on the mobile storage system in software, hardware, or a combination of hardware and software.

At 202, the mobile storage system receives data from an IoT device. The IoT device may be typically located proximate to the IoT device. The short range network interface of the IoT device may be arranged to wake up periodically such as every 30 seconds. After being awakened, the IoT device may send data generated by the IoT device via its short range network interface to the mobile storage system. Because of the close proximity, the short range network interface of the mobile storage system may be always on, so that the mobile storage system is able to receive the data generated by the IoT device. Data does not remain on the IoT device for extended periods of time, reducing chances that the data will be lost or corrupted on the IoT device. The low power communication also reduces health risks because high power wireless signals are not transmitted. In some examples, the mobile storage system may receive data from a plurality of IoT devices in proximity to mobile storage system.

At 204, the received data is stored in data storage of the mobile storage system. For example, the processor of the mobile storage system may store the received data in the SSD or HDD of the mobile storage system.

At 206, a communication bandwidth to the cloud data storage is determined. The communication bandwidth is an indication of a data transfer rate to the cloud data storage. In examples, the communication bandwidth level detector indicates the communication bandwidth to the cloud data storage for the communication protocol operating on the long range network interface and includes information such as the data rate from the mobile storage system to the cloud data storage. The communication bandwidth level detector may determine the communication bandwidth to the cloud data storage in many ways. For example, the bandwidth level detector may send a predetermined amount of data to the cloud data storage and time how long it takes to receive an acknowledgement from the cloud data storage that the data is received. The time is indicative of the communication bandwidth to the cloud data storage. Communication bandwidth to the cloud data storage determines whether the data transfer is efficient. If the bandwidth is high, then data transfer to the cloud data storage is efficient in terms of power and time. If the bandwidth is low, then data transfer to the cloud data storage is inefficient in terms of the power and time.

In examples, the mobile storage system does not automatically transfer the data stored in the data storage of mobile storage system to the cloud data storage based only on the communication bandwidth to the cloud data storage. The transfer may be also based on a power level of the power supply of the mobile storage system. The mobile storage system needs to have enough power to sustain the communication bandwidth until the transfer of the data to the cloud data storage is complete.

At 208, a power level of the power supply of the mobile storage system is determined. The mobile storage system may have a power supply level detector which indicates the power level of the power supply. The power level may be an indicator of battery charge if the power supply is a battery or an indicator of whether the charging interface of the mobile storage system is connected to a power outlet which provides a reliable source of power to the mobile storage system. For example, the power level may be a percentage which ranges from 0 to 100 percent. The power level may be represented by a corresponding percentage of charge of a battery and if the charging interface of the mobile storage system is connected to a power outlet, the power level may be indicated as 100 percent. The power level of the power supply may be indicated in other ways as well.

At 210, a determination is made whether to transfer the data based on the power level of the power supply of the mobile storage system and the communication bandwidth to the cloud data storage. For example, the mobile storage system may compare the communication bandwidth to the cloud data storage system to a bandwidth threshold. The bandwidth threshold may be a minimum acceptable communication bandwidth to the cloud data storage which is power efficient. The bandwidth threshold may be a predetermined value or configurable by a user of the mobile storage system. If the communication bandwidth to the cloud data storage meets the bandwidth threshold, then the mobile storage system may determine whether the mobile storage system has enough power to complete the data transfer at the communication bandwidth. The mobile storage system may determine a maximum amount of data that can be transferred from the mobile storage system to the cloud data storage when the power supply has the determined power level and the mobile station communication bandwidth. This determination may be calculated by the mobile storage system or indicated by a mathematical model stored on the mobile storage system. The mathematical model may model operation of the mobile storage system including power consumption of the mobile storage system when transferring data to the cloud data storage at different communication bandwidths. The communication bandwidth and power level of the power supply of the mobile storage system may be input into the mathematical model and the mathematical model may output the maximum amount of data that may be transferred. If the amount of data to transfer by the mobile storage system is less than the maximum amount of data, then the data transfer is able to be performed. If the amount of data to transfer by the mobile storage system is greater than the maximum amount of data, then the data transfer is not able to be performed. In this regard, the transfer may be performed when the power supply has a higher power level or is being charged. In the case when the power supply in a battery, the battery will have the higher power level when it is adequately charged.

In some examples, a user controls whether the mobile storage system transfers the data generated by the IoT to the cloud data storage. The mobile storage system may seek input from the user as to whether to transfer the data instead of itself determining whether to transfer the data. The mobile storage system may send an indication of the power level and communication bandwidth to the remote device and request that a user of the remote device authorize or deny the transfer. The user may review the power level and communication bandwidth and opportunistically decide whether to authorize or deny the transfer by sending an indication to the mobile storage system via the remote device. Alternatively, if the mobile storage system determines not to transfer the data, the mobile storage system may seek input from the user as to whether to still transfer the data. The mobile storage system may send an indication of the power level and communication bandwidth to the remote device and request that a user of the remote device authorize or deny the transfer. The user may review the power level and communication bandwidth and opportunistically decide whether to authorize or deny the transfer by causing the remote device to send an indication to the mobile storage system. In this regard, the user may be able to override the determination of the mobile storage system. In some examples, the user may also reduce a size of the data to transfer and cause the remote device to provide this indication to the mobile storage system. The mobile storage system may then transfer the indicated size of the data so that at least a portion of the data may be transferred to the cloud data storage. Further, the user may review the power level and communication bandwidth on the mobile storage system and provide the indication to authorize or deny the transfer on the mobile storage system, rather than via the remote device.

At 212, the mobile storage system waits for a predetermined time if the determination is not to perform the transfer. The data transfer not performed since the transfer may not be able to be completed because of communication bandwidth and/or power level constraints. The communication bandwidth may vary over time depending on proximity of the mobile storage system to the cloud data storage and interfering signals, among other reasons. Also, the power level of the power supply of the mobile storage system may change depending on whether the battery has more charge and/or is connected to the power outlet. The mobile storage system may wait the predetermined time before returning to steps 206, 208 to determine the communication bandwidth to the cloud data storage and the power level of the power supply of the mobile storage system, respectively, under changed conditions.

At 214, the mobile storage system transfers the data to the cloud data storage if the determination is to perform the transfer. The mobile storage system transfers the data via the long range network interface of the mobile storage to the cloud data storage. Then, the mobile storage may delete the data from the mobile storage system.

In some examples, the long range network interface of the mobile storage system to the cloud data storage may be configurable to operate in accordance with one of a plurality of communication protocols such as 3G, 4G, 5G, or WiFi. Each of these communication protocols support different communication bandwidths to the cloud data storage and consume different amounts of power. The mobile storage system may select a communication protocol that allows for efficiently transferring the data generated by the IoT device to the cloud data storage.

Figure 3:
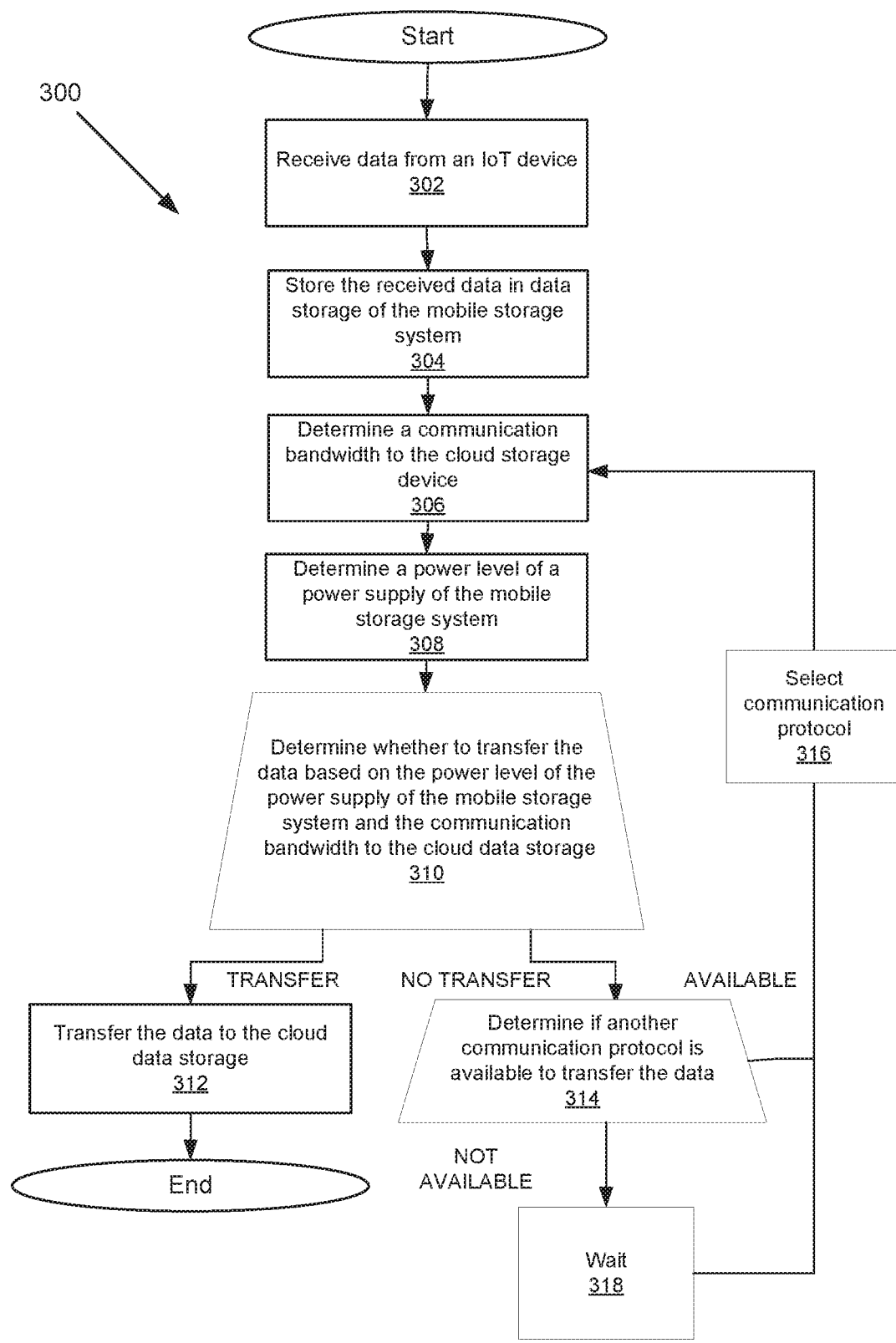
FIG. 3 is an example flow chart of functions associated with the mobile storage system for transferring the data generated by the IoT device which is stored on the mobile storage system to the cloud data storage.

FIG. 3 is an example flow chart 300 of functions associated with the mobile storage system for transferring the data generated by the IoT device which is stored on the mobile storage system to the cloud data storage. The transfer is efficient and opportunistic because different communication protocols are available to transfer the data generated by the IoT device from the mobile storage system to the cloud data storage. The functions may be implemented in software, hardware, or a combination of hardware and software.

At 302, the mobile storage system receives data from an IoT device. The mobile storage system may receive the data via its short range network interface.

At 304, the received data is stored in data storage of the mobile storage system. For example, the received data may be stored in the SSD or HDD of the mobile storage system.

At 306, a communication bandwidth to the cloud data storage is determined for a communication protocol. The communication protocol may be one of a plurality of communication protocols supported by the long range network interface of the mobile storage system for transferring data to the cloud data storage. The communication bandwidth is an indication of a data transfer rate to the cloud data storage specific for the communication protocol such that different communication protocols have different bandwidths. In examples, the bandwidth level detector indicates the communication bandwidth to the cloud data storage for the communication protocol.

At 308, a power level of a power supply of the mobile storage system is determined. The mobile storage system may have a power supply level detector which indicates the power level of the power supply of the mobile storage system.

At 310, the mobile storage system determines whether to transfer the data based on the power level and communication bandwidth. The determination may be performed in a manner similar to that described with respect to step 210 above.

At 312, the mobile storage system transfers the data to the cloud data storage if the determination is to perform the data transfer. The mobile storage system transfers the data to the cloud data storage via the long range network interface.

At 314, the mobile storage system determines if another communication protocol is available to transfer the data if the determination is not to perform the data transfer. The other communication protocol may be a selected protocol from the plurality of communication protocols supported by the mobile storage system. To illustrate, if 3G is used to determine whether to perform the data transfer at step 310, the mobile storage system may determine whether WiFi is available to perform the data transfer.

If another communication protocol is available, then the other communication protocol is selected at 316 and processing returns to step 306 to determine whether the data transfer is able to be performed with the other communication protocol. Based on the power level and communication bandwidth, the mobile storage system may perform the data transfer. If none of communication protocols permit the data transfer, the mobile storage system may wait at step 318 for predetermined time before retrying the transfer with a communication protocol which may be a selected protocol from the plurality of communication protocols.

In some examples, data generated by the IoT may not be automatically transferred to the cloud data storage even if the communication bandwidth and/or power level permits the transfer. The data may not be transferred for privacy or data security reasons until authorized by a user. For example, the user may not trust privacy or data security of the cloud data storage, and may not transfer certain data to the cloud data storage because of these reasons.

Figure 4:
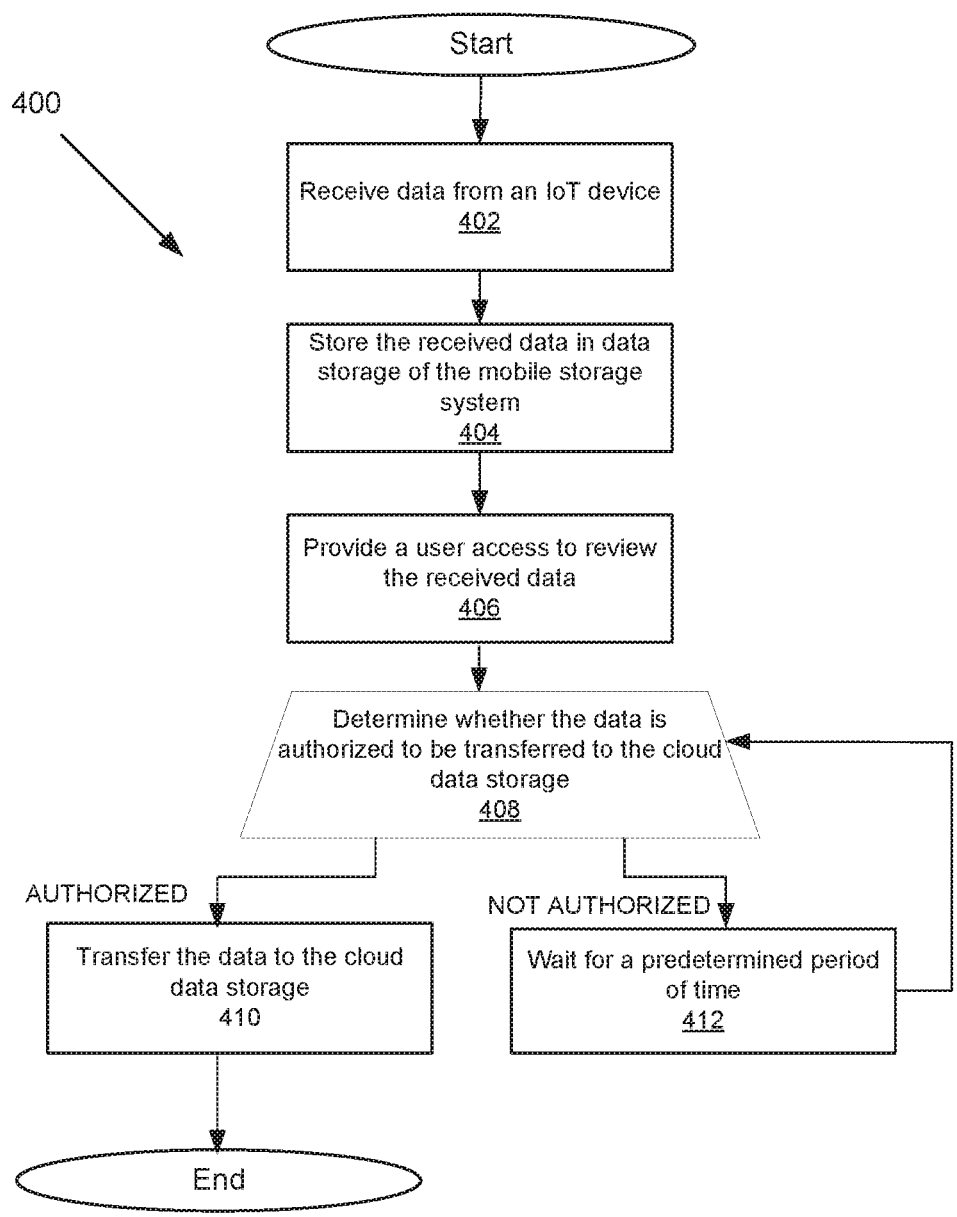
FIG. 4 is an example flow chart of functions associated with controlling the transfer of the data generated by the IoT device which is stored on the mobile storage system to the cloud data storage based on a user review of the data.

FIG. 4 is an example flow chart of functions 400 associated with controlling the transfer of data generated by the IoT which is stored on the mobile storage system to the cloud data storage based on user review of the data. The control of transfer based on user review of the data protects user privacy and security of the data. The functions 400 may be implemented on the mobile storage system in software, hardware, or a combination of hardware and software.

At 402, the mobile storage system receives data from an IoT device. The mobile storage system may receive the data via its short range network interface.

At 404, the received data is stored in data storage of the mobile storage system. The received data may be stored in the SSD or HDD of the mobile storage system, for example.

At 406, the mobile storage system provides a user access to review the received data. For example, the IoT device may be in the form of a wristband device to measure heart-beat, body temperature, and other personal health related profiles or an implanted device to measure vitals such as glucose and internal imaging. The user might want to review the received data before transferring the data to the cloud data storage because of privacy or data security concerns. The mobile storage system may send the received data to the remote device to allow the user to review the data on the remote device. Alternatively, the mobile storage system may display the received data on a display screen of the mobile storage system itself. In some examples, the mobile storage system may have security features such as password protection or fingerprint identification to further protect privacy of the data on the mobile storage system or remote device before being provided to the user for review.

At 408, a determination is made whether the data is authorized to be transferred to the cloud data storage. After the user completes his review of the data, the user may authorize or deny the transfer. The user may cause the remote device to send a respective indication to authorize or deny the transfer to the mobile storage system or the user may provide an indication on an input device of the mobile storage system.

At 412, the mobile storage system waits for a predetermined time if the data is not authorized to be transferred to the cloud data storage. This would allow the user to reconsider his denial of authorization. Then, the user's authorization is checked again at 408. In some examples, the user may provide an indication to the mobile storage system that the data is not be transferred at all, in which case, the mobile storage system may keep track of this indication (e.g., in memory) and not request that the user authorize the transfer of the data again.

At 410, the mobile storage system transfers the data to the cloud data storage if the data is authorized to be transferred to the cloud data storage. The transfer may be conducted further in accordance with steps 206-212 and/or 306-316 of FIGS. 2-3 to result in an efficient data transfer.

Example Apparatus

Figure 5:
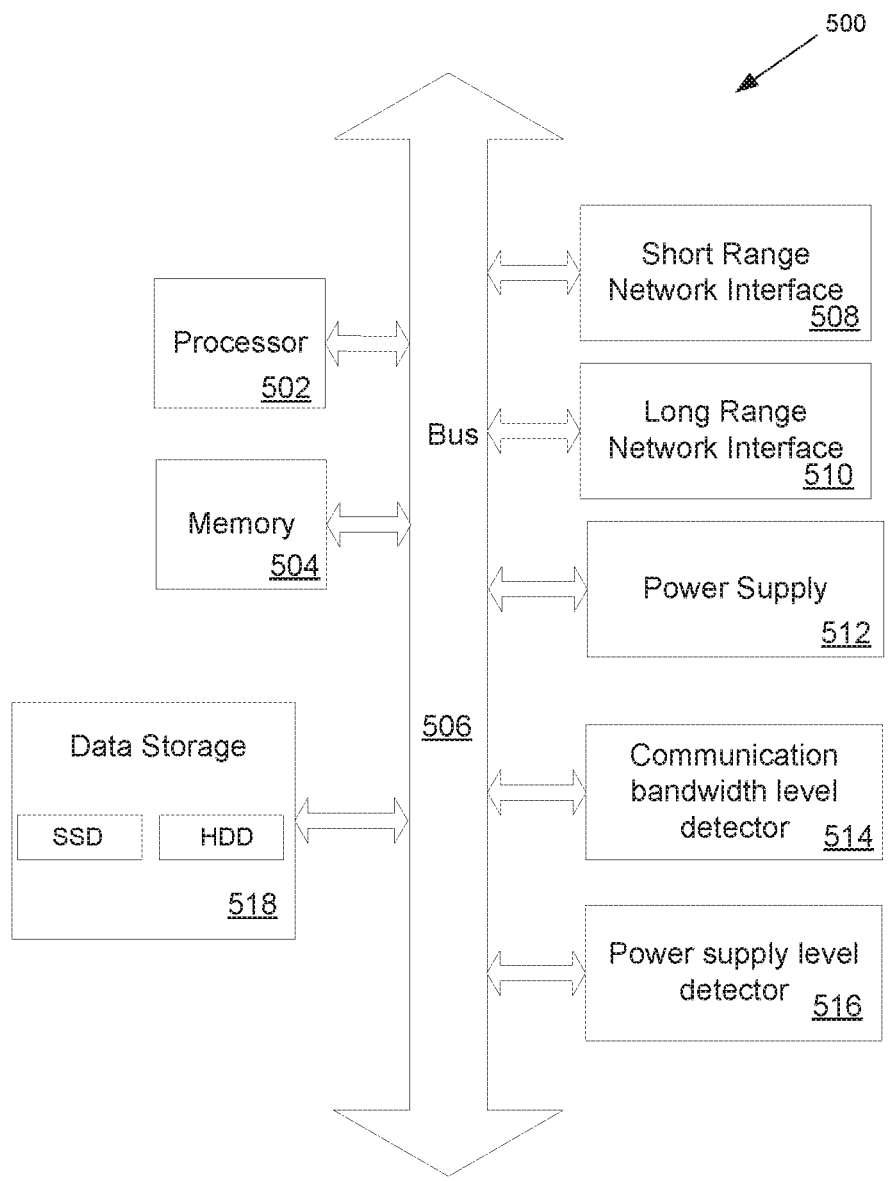
FIG. 5 illustrates an example architecture of the mobile storage system.

FIG. 5 illustrates an example architecture 500 of the mobile storage system. In examples, the architecture 500 may include a bus 506 (e.g., Peripheral Component Interconnect (PCI), Industry Standard Architecture (ISA), PCI-Express, New Bus (NuBus), Advanced Extensible Bus AXI Bus etc.) that facilitates communication between one or more of a processor 502, memory 504, data storage 518, short range network interface 508, long range network interface 510, power supply 512, communication bandwidth level detector 514, and power supply level detector 516 of the mobile storage system.

The processor 502 (possibly including multiple processors, multiple cores, multiple nodes, and/or implementing multi-threading, etc.) may coordinate transfer of data into, within, and out of the mobile storage system. The memory 504 may be configured as system memory (e.g., one or more of cache, random access memory (RAM), synchronous RAM (SRAM), dynamic RAM (DRAM), zero capacitor RAM, Twin Transistor RAM, embedded DRAM (eDRAM), extended data output RAM (EDO RAM), double data rate RAM (DDR RAM), electrically erasable programmable read only memory (EEPROM), Nano-RAM (NRAM), resistive RAM (RRAM), silicon-oxide-nitride-oxide-silicon memory (SONOS), parameter random access memory (PRAM), etc.) or any one or more other possible realizations of non-transitory machine-readable media/medium.

The short range network interface 508 may facilitate communication with the IoT device and the long range network interface 510 may be configured to facilitate communication with the remote device and cloud data storage. In some examples, the short range communication interface may implement a Bluetooth, NFC protocol, or WiFi protocol while the long range communication interface may implement 3G, 4G, 5G, or WiFi protocol. The data storage 518 may be an SSD, HDD, or combination of SSD and HDD.

A power supply 512 such as a battery may power the mobile storage system 112. Further, the communication bandwidth level detector 514 may detect a communication bandwidth to the cloud data storage and a power level detector 516 may determine a power level of the power supply 512 such as a battery charge level.

The processor 502 may facilitate transfer of the data generated by the IoT in accordance with the examples described above, including controlling when data received from an IoT device is transferred to the cloud data storage. These functions may be implemented in hardware and/or software (e.g., computer code, program instructions, program code, computer instructions) stored on a non-transitory machine readable medium/media. In some instances, the processor 502 and memory 504 may implement or facilitate implementing the functionalities of the communication bandwidth level detector 514 and power level detector 516. Further, realizations can include fewer or additional components not illustrated in FIG. 5 (e.g., video cards, audio cards, additional network interfaces, peripheral devices, etc.). The processor 502 and the memory 504 are coupled to the bus 506. Although illustrated as being coupled to the bus 506, the memory 504 can be coupled to the processor 502.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method for transmitting data from a mobile storage device to one or more cloud storage devices, wherein the mobile storage device includes (i) a first network interface, (ii) a second network interface, and (iii) memory, the method comprising:
 receiving, at the first network interface of the mobile storage device, data from an Internet of things device;
 storing the data received from the Internet of things device in the memory of the mobile storage device;
 determining, at the mobile storage device, an available communication bandwidth for uplinking the data stored in the memory of the mobile storage device from the mobile storage device to one or more cloud data storage devices;
 determining, at the mobile storage device, a power level of a power supply that powers the mobile storage device;
 transmitting a signal from the mobile storage device to a remote device, the signal including at least one of (i) the data stored in the memory of the mobile storage device, (ii) an indication of the available communication bandwidth, or (iii) an indication of the power level of the power supply, wherein the remote device is accessible to a user of the Internet of things device and is separate from the one or more cloud data storage devices;
 based on the signal, receiving an indication from the remote device indicating whether the user authorizes uplinking the data, stored in the memory of the mobile storage device, from the mobile storage device to the one or more cloud data storage devices; and
 in response to the indication authorizing uplinking of the data, permitting uplinking, via the second network interface, the data stored in the memory of the mobile storage device from the mobile storage device to the one or more cloud data storage devices.

2. The method of claim 1, wherein:
 the data, received from the Internet of things device, is received at the first network interface according to a wireless local area network protocol; and
 the data, stored in the memory of the mobile storage device, is uplinked from the second network interface according to a cellular protocol.

3. The method of claim 1, comprising:
 prior to uplinking the data, stored in the memory of the mobile storage device from the mobile storage device, to the one or more cloud data storage devices, transmitting the data stored in the memory of the mobile storage device to the remote device; and
 based on the data, receiving the indication from the remote device indicating the user authorizes uplinking the data stored in the memory of the mobile storage device from the mobile storage device to the one or more cloud data storage devices,
 wherein the data stored in the memory of the mobile storage device is uplinked to the one or more cloud data storage devices based on the indication from the remote device indicating the user authorizes uplinking the data stored in the memory of the mobile storage device.

4. The method of claim 1, wherein the power level of the power supply is indicative of a charge of a battery of the mobile storage device.

5. The method of claim 1, comprising:
 sending an indication of the available communication bandwidth and the power level from the mobile storage device to the remote device; and
 based on the available communication bandwidth and the power level, receiving the indication from the remote device indicating the user authorizes uplinking the data, stored in the memory of the mobile storage device, to the one or more cloud data storage devices,
 wherein the data stored in the memory of the mobile storage device is uplinked from the mobile storage device to the one or more cloud data storage devices based on the indication received from the remote device indicating the user authorizes uplinking the data, stored in the memory of the mobile storage device, to the one or more cloud data storage devices.

6. The method of claim 1, wherein:
 the Internet of things device is implemented as an imaging device, an appliance or a health monitoring device; and
 the remote device is a smart phone.

7. The method of claim 1, further comprising:
 determining whether the power level of the power supply is able to power the mobile storage device while operating with the available communication bandwidth and until the uplinking of the data, stored in the memory of the mobile storage device, to the one or more cloud data storage devices is completed; and
 in response to the power supply being able to power the mobile storage device until the uplinking of the data stored in the memory of the mobile storage device to the one or more cloud data storage devices is completed, permitting the uplinking of the data, stored in the mobile storage device, to the one or more cloud data storage devices.

8. A non-transitory computer-readable medium storing instructions that, when executed by one or more processors, cause the one or more processors to:
 receive, at a first network interface of a mobile storage device, data from an Internet of things device;
 store the data received from the Internet of things device in memory of the mobile storage device;
 determine (i) an available communication bandwidth for uplinking the data from the mobile storage device to one or more cloud data storage devices, and (ii) a power level of a power supply of the mobile storage device;
 transmit a signal from the mobile storage device to a remote device, the signal including at least one of (i) the data stored in the memory of the mobile storage device, (ii) an indication of the available communication bandwidth, or (iii) an indication of the power level of the power supply, wherein the remote device is accessible to a user of the Internet of things device and is separate from the one or more cloud data storage devices;
 based on the signal, receive an indication from the remote device indicating whether the user authorizes uplinking the data stored in the memory of the mobile storage device from the mobile storage device to the one or more cloud data storage devices; and
 in response to the indication authorizing uplinking of the data stored in the memory of the mobile storage device to the one or more cloud data storage devices, permit uplinking, via a second network interface, the data stored, in the memory of the mobile storage device, from the mobile storage device to the one or more cloud data storage devices.

9. The non-transitory computer-readable medium of claim 8, wherein:
the data, received from the Internet of things device, is received at the first network interface according to a wireless local area network protocol; and
the data, stored in the memory of the mobile storage device, is uplinked from the second network interface according to a cellular protocol.

10. The non-transitory computer-readable medium of claim 8, wherein the instructions cause the one or more processors to:
prior to uplinking the data, stored in the memory of the mobile storage device, from the mobile storage device to the one or more cloud data storage devices, uplink the data stored in the memory of the mobile storage device to the remote device;
based on the data, receive the indication from the remote device indicating the user authorizes uplinking the data, stored in the memory of the mobile storage device from the mobile storage device, to the one or more cloud data storage devices; and
uplink the data, stored in the memory of the mobile storage device, to the one or more cloud data storage devices based on the indication from the remote device indicating the user authorizes uplinking the data stored in the memory of the mobile storage device.

11. The non-transitory computer-readable medium of claim 8, wherein the power level of the power supply is indicative of a charge of a battery of the mobile storage device.

12. The non-transitory computer-readable medium of claim 8, wherein the instructions cause the one or more processors to:
send an indication of the available communication bandwidth and the power level from the mobile storage device to the remote device;
based on the available communication bandwidth and the power level, receive the indication from the remote device indicating the user authorizes uplinking the data, stored in the memory of the mobile storage device, to the one or more cloud data storage devices; and
uplink the data, stored in the memory of the mobile storage device, from the mobile storage device to the one or more cloud data storage devices based on the indication received from the remote device indicating the user authorizes uplinking the data stored in the memory of the mobile storage device to the one or more cloud data storage devices.

13. The non-transitory computer-readable medium of claim 8, wherein:
the Internet of things device is an imaging device, an appliance or a health monitoring device; and
the remote device is a smart phone.

14. The non-transitory computer-readable medium of claim 8, wherein the instructions cause the one or more processors to:
determine whether the power level of the power supply is able to power the mobile storage device, operating with the available communication bandwidth, until the uplinking of the data, stored in the memory of the mobile storage device, to the one or more cloud data storage devices is completed; and
in response to the power supply being able to power the mobile storage device until the uplinking of the data, stored in the memory of the mobile storage device, to the one or more cloud data storage devices is completed, permit the uplinking of the data stored in the memory of the mobile storage device to the one or more cloud data storage devices.

15. A mobile storage device comprising:
a memory configured to store data;
a first network interface;
a second network interface;
a communication bandwidth detector configured to detect an available communication bandwidth for uplinking the data stored in the memory from the mobile storage device to one or more cloud data storage devices;
a power level detector configured to detect a power level of a power supply of the mobile storage device,
wherein the memory is configured to store instructions, when executed by one or more processors of the mobile storage device, cause the mobile storage device to:
receive, at the first network interface, the data from an Internet of things device;
store the data received from the Internet of things device in the memory;
determine via the communication bandwidth detector the available communication bandwidth;
determine via the power level detector the power level;
transmit a signal from the mobile storage device to a remote device, the signal including at least one of (i) the data stoted stored in the memory, (ii) an indication of the available communication bandwidth, or (iii) an indication of the power level of the power supply, wherein the remote device is accessible to a user of the Internet of things device and is separate from the one or more cloud data storage devices;
based on the signal, receive an indication from the remote device indicating whether the user authorizes uplinking the data stored in the memory from the mobile storage device to the one or more cloud data storage devices; and
in response to the indication authorizing uplinking of the data, permit uplinking via the second network interface the data stored in the memory to the one or more cloud data storage devices.

16. The mobile storage device of claim 15, wherein:
the data is received at the first network interface according to a wireless local area network protocol; and
the data stored in the memory is uplinked from the second network interface according to a cellular protocol.

17. The mobile storage device of claim 15, wherein the instructions cause the one or more processors to:
prior to uplinking the data stored in the memory from the mobile storage device to the one or more cloud storage devices, uplink the data stored in the memory from the mobile storage device to the remote device;
based on the data, receive the indication from the remote device indicating the user authorizes uplinking the data stored in the mobile storage device from the mobile storage device to the one or more cloud data storage devices; and
uplink the data stored in the memory to the one or more cloud data storage devices based on the indication from the remote device indicating the user authorizes uplinking the data stored in the mobile storage device.

18. The mobile storage device of claim 15, wherein the power level of the power supply is indicative of a charge of a battery of the mobile storage device.

19. The mobile storage device of claim 15, wherein the instructions cause the one or more processors to:

send an indication of the available communication bandwidth and the power level of the power supply to the remote device; and based on the available communication bandwidth and the power level of the power supply, receive the indication from the remote device indicating the user authorizes uplinking the data from the memory to the one or more cloud data storage devices; and uplink the data from the memory based on the indication from the remote device indicating the user authorizes the uplinking of the data from the memory to the one or more cloud data storage devices.

20. The mobile storage device of claim 15, wherein the instructions cause the one or more processors to:

determine whether the power level of the power supply is able to power the mobile storage device, operating with the available communication bandwidth, until the uplinking of the data stored in the memory to the one or more cloud data storage devices is completed; and in response to the power supply being able to power the mobile storage device until the uplinking of the data stored in the memory to the one or more cloud data storage devices is completed, permit the uplinking of the data stored in the memory to the one or more cloud data storage devices.

21. The method of claim 1, wherein the remote device is separate from the Internet of things device.

22. A method comprising:

receiving, at a first network interface of a mobile storage device, data from an Internet of things device;

storing the data in a memory of the mobile storage device;

transmitting the data stored in the mobile storage device and received from the Internet of things device to a remote device, wherein the remote device is accessible to a user of the Internet of things device and is separate from one or more cloud data storage devices;

based on the data transmitted to the remote device, receiving an indication from the remote device indicating whether the user authorizes uplinking the data, stored in the memory of the mobile storage device, to the one or more cloud data storage devices; and in response to the indication authorizing uplinking of the data stored in the memory of the mobile storage device to the one or more cloud data storage devices, permitting uplinking via a second network interface of the data, stored in the memory of the mobile storage device, from the mobile storage device to the one or more cloud data storage devices.

23. The method of claim 22, further comprising:

determining at the mobile storage device an available communication bandwidth for uplinking the data, stored in the memory of the mobile storage device, from the mobile storage device to one or more cloud data storage devices;

determining at the mobile storage device a power level of a power supply that powers the mobile storage device;

transmitting to the remote device a signal including (i) the data stored in the memory of the mobile storage device, (ii) the available communication bandwidth, and (iii) the power level of the power supply; and based on the signal, receiving the indication from the remote device indicating whether the user authorizes uplinking the data stored in the memory of the mobile storage device to the one or more cloud data storage devices.

* * * * *